US012568968B2

(12) United States Patent
Dayan et al.

(10) Patent No.: US 12,568,968 B2
(45) Date of Patent: Mar. 10, 2026

(54) HERBICIDE COMBINATIONS COMPRISING GLUFOSINATE AND EPYRIFENCACIL

(71) Applicants: BASF SE, Ludwigshafen (DE); COLORADO STATE UNIVERSITY RESEARCH FOUNDATION, Fort Collins, CO (US)

(72) Inventors: Franck Dayan, Fort Collins, CO (US); Hudson Takano, Fort Collins, CO (US); Philip Westra, Fort Collins, CO (US); Steven Joseph Bowe, Research Triangle Park, NC (US); Rex A. Liebl, Research Triangle Park, NC (US); Douglas Findley, Research Triangle Park, NC (US); Ingo Meiners, Limburgerhof (DE)

(73) Assignees: BASF SE, Ludwigshafen (DE); COLORADO STATE UNIVERSITY RESEARCH FOUNDATION, Fort Collins, CO (US)

( * ) Notice: Subject to any disclaimer, the term of this patent is extended or adjusted under 35 U.S.C. 154(b) by 706 days.

(21) Appl. No.: 17/795,575

(22) PCT Filed: Jan. 20, 2021

(86) PCT No.: PCT/EP2021/051110

§ 371 (c)(1),
(2) Date: Jul. 27, 2022

(87) PCT Pub. No.: WO2021/151738

PCT Pub. Date: Aug. 5, 2021

(65) Prior Publication Data

US 2023/0086500 A1 Mar. 23, 2023

Related U.S. Application Data

(60) Provisional application No. 62/968,466, filed on Jan. 31, 2020.

(51) Int. Cl.
*A01N 43/54* (2006.01)
*A01N 57/20* (2006.01)
*A01P 13/00* (2006.01)

(52) U.S. Cl.
CPC ............. *A01N 43/54* (2013.01); *A01N 57/20* (2013.01); *A01P 13/00* (2021.08)

(58) Field of Classification Search
CPC ...................................................... A01N 43/54
See application file for complete search history.

(56) References Cited

U.S. PATENT DOCUMENTS 4,168,963 A 9/1979 Rupp et al.
4,265,654 A 5/1981 Takematsu et al.
5,130,246 A 7/1992 Schulz et al.
5,530,142 A 6/1996 Zeiss
5,753,470 A 5/1998 Then et al.
6,335,186 B1 1/2002 Bartsch et al.
10,260,078 B2 4/2019 Green et al.
2017/0006873 A1* 1/2017 Jones, Jr. ............... A01N 43/54

FOREIGN PATENT DOCUMENTS

EP 0127429 A2 12/1984
EP 0248357 A2 12/1987
EP 0249188 A2 12/1987
EP 0344683 A2 12/1989
EP 0477902 A2 4/1992
EP 1122244 A1 8/2001
JP H09244883 A 9/1997
WO WO-03/024221 A1 3/2003
WO WO-2006/104120 A1 10/2006
WO WO-2009/141367 A2 11/2009
WO WO-2011/104213 A2 9/2011
WO WO-2016/113334 A1 7/2016
WO WO-2017/007873 A1 1/2017
WO WO-2019/030086 A2 2/2019
WO WO-2019/030091 A2 2/2019
WO WO-2019/030095 A2 2/2019
WO WO-2019/030097 A2 2/2019
WO WO-2019/030098 A1 2/2019

OTHER PUBLICATIONS

European Search Report for EP Patent Application No. 20161407.0, Issued on Aug. 24, 2020, 6 pages.
Horelein et al., Glufosinate (Phosphinothricin), a natural amino acid with unexpected herbicidal properties, Reviews of Environmental Contamination and Toxicology, 138: 73-145 (Jan. 1994).
International Application No. PCT/EP2021/051110, International Search Report and Written Opinion, mailed Apr. 16, 2021.
IP.com Prior Art Database Technical Disclosure, IP.com No. IPCOM000254869D, Aug. 9, 2008, 341 pages.

(Continued)

*Primary Examiner* — Tracy Vivlemore

(74) *Attorney, Agent, or Firm* — MARSHALL, GERSTEIN & BORUN LLP

(57) ABSTRACT

The present invention relates to specific herbicide combinations comprising (i) L-glufosinate and/or salts thereof and (ii) epyrifenacil (Acetic acid, 2-[[3-[2-chloro-5-[3,6-dihydro-3-methyl-2,6-dioxo-4-(trifluoromethyl)-1(2H)-pyrimidinyl]-4-fluorophenoxy]-2-pyridinyl]oxy]-, ethyl ester) in specific ratios, and to compositions comprising said herbicide combinations in these ratios. The present invention further relates to a method of producing said specific herbicide combinations and compositions comprising said specific herbicide combinations. The present invention also relates to the use of said specific herbicide combinations and compositions comprising said specific herbicide combinations in the field of agriculture, for controlling harmful plants or undesired plant growth, as well as to corresponding methods.

13 Claims, No Drawings

(56) References Cited

OTHER PUBLICATIONS

Soloshonok, et al., "Asymmetric synthesis of phosphorus analogues of dicarboxylic ?-amino acids", Journal of the Chemical Society, Perkin Transactions, vol. 1, Issue 12, 1992, pp. 1525-1529.
Theodoridis, et al., "Chapter 3 Protoporphyrinogen IX oxidase inhibitors", Modern crop protection compounds, ed. Wolfgang Kramer, 2nd Edition, Dec. 14, 2011, pp. 163-195.
Zagar, et al., "Chapter: 3 Protoporphyrinogen IX oxidase inhibitors", Modern Crop Protection Compounds, ed. Peter Jeschke, 3rd Edition, Jan. 25, 2019, pp. 173-211.

* cited by examiner

HERBICIDE COMBINATIONS COMPRISING GLUFOSINATE AND EPYRIFENCACIL

CROSS-REFERENCE TO RELATED APPLICATIONS

This is the U.S. national phase of International Application No. PCT/EP2021/051110, filed Jan. 20, 2021, which claims the benefit of U.S. Provisional Patent Application No. 62/968,466, filed Jan. 31, 2020, incorporated herein by reference in its entirety; and European Patent Application No. 20161407.0, filed Mar. 6, 2020.

The present invention relates to specific herbicide combinations comprising (i) the herbicide glufosinate, especially the L-glufosinate and/or salts thereof, and (ii) and a second herbicide selected from the class of protoporphyrinogen-IX oxidase inhibitors, which is epyrifenacil, characterized in that the herbicide (i) and the herbicide (ii) are combined in specific ratios. The present invention relates as well to compositions comprising said specific ratios of such herbicide combinations. The present invention further relates to a method of producing said specific herbicide combinations and compositions comprising said specific herbicide combinations. The present invention also relates to the use of said specific herbicide combinations and compositions comprising said specific herbicide combinations in the field of agriculture and for controlling harmful plants or undesired plant growth, as well as to corresponding methods.

Component (i) of the herbicide combination according to the present invention is glufosinate, especially L-glufosinate and/or agronomically acceptable salts thereof.

U.S. Pat. No. 4,168,963 describes phosphorus-containing compounds with herbicidal activity, of which, in particular, phosphinothricin (2-amino-4-[hydroxy(methyl)phosphinoyl]butanoic acid; common name: glufosinate) and its salts have acquired commercial importance in the agrochemistry (agricultural chemistry) sector.

Glufosinate, with IUPAC-Name: (2RS)-2-amino-4-[hydroxy(methyl)phosphinoyl]butyric acid or 4-[hydroxy (methyl)phosphinoyl]-DL-homoalanine, CAS Reg. No. 51276-47-2) and with common name DL-4-[hydroxyl (methyl)phosphinoyl]-DL-homoalaninate, is known, as well as agronomically acceptable salts thereof, in particular glufosinate-ammonium (IUPAC-Name: ammonium (2RS)-2-amino-4-(methylphosphinato)butyric acid, CAS Reg. No. 77182-82-2).

For example, glufosinate and its salts—such as glufosinate ammonium—and its herbicidal activity have been described e.g. by F. Schwerdtle et al. Z. Pflanzenkr. Pflanzenschutz, 1981, Sonderheft IX, pp. 431-440. Glufosinate as racemate and its salts are commercially available under the tradenames Basta™ and Liberty™.

Hoerlein et al., in Rev. Environ. Contam. Toxicol. Vol. 138, 1994) "Glufosinate (phosphinothricin), a natural amino acid with unexpected herbicidal properties", discusses the glutamate synthesis inhibitor glufosinate.

Glufosinate is represented by the following structure (1):

(1)

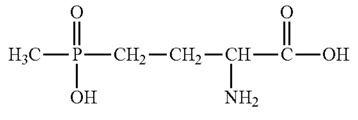

The compound of formula (1) is a racemate.

Glufosinate is a racemate of two enantiomers, out of which only one shows sufficient herbicidal activity (see e.g. U.S. Pat. No. 4,265,654 and JP92448/83). Even though various methods to prepare L-glufosinate (and respective salts) are known (e.g. U.S. Ser. No. 10/260,078 B2), the mixtures known in the art do not point at the stereochemistry, meaning that the racemate is present (e.g. WO 2003024221, WO 2011104213, WO 2016113334, WO 2009141367).

In one embodiment, and if not otherwise defined, the abovementioned invention relates to herbicidal glufosinate mixtures as described above, wherein the glufosinate comprises about 50% by weight of the L-enantiomer and about 50% by weight of the D-enantiomer.

L-glufosinate, with IUPAC-Name (2S)-2-amino-4-[hydroxy(methyl)phosphinoyl]butyric acid (CAS Reg. No. 35597-44-5) and also called glufosinate-P, can be obtained commercially or may be prepared for example as described in WO2006/104120, U.S. Pat. No. 5,530,142, EP0248357A2, EP0249188A2, EP0344683A2, EP0367145A2, EP0477902A2, EP0127429 and J. Chem. Soc. Perkin Trans. 1, 1992, 1525-1529.

Thus, the present invention may refer to both possibilities, namely to glufosinate mixtures, which would comprise about 50% by weight of the L-enantiomer and to L-glufosinate mixtures. This may be represented especially, but without being limited to, by the term (L-)glufosinate.

Preferably, the agronomically acceptable salts of glufosinate or L-glufosinate are the sodium, potassium or ammonium ($NH_4^+$) salts of glufosinate or L-glufosinate, in particular glufosinate-P-ammonium (IUPAC-Name: ammonium (2S)-2-amino-4-(methylphosphinato)butyric acid, CAS Reg. No. 73777-50-1), glufosinate-P-sodium (IUPAC-Name: sodium (2S)-2-amino-4-(methylphosphinato)butyric acid; CAS Reg. No. 70033-13-5) and glufosinate-P-potassium (IUPAC-Name: potassium (2S)-2-amino-4-(methylphosphinato)butyric acid) for L-glufosinate.

Hence, mixtures according to the present invention may contain (L-)glufosinate-ammonium or (L-)glufosinate-sodium or (L-)glufosinate-potassium as (L-)glufosinate salts and (L-)glufosinate as free acid. Especially preferred are mixtures, which contain (L-)glufosinate-ammonium as L-glufosinate salt. Especially preferred as well are mixtures, which contain (L-)glufosinate-potassium as L-glufosinate salt.

Herbicidally active compounds belonging to the class of protoporphyrinogen-IX oxidase inhibitors, also called as PPO-inhibitors, as well as their pesticidal action and methods for producing them are generally known, for example in the Pesticide Manual V5.2 (ISBN 978 1 901396 85 0) (2008-2011) amongst other sources.

Herbicidally active compounds belonging to the class of protoporphyrinogen-IX oxidase inhibitors, also called as PPO-inhibitors is also known in C. Zagar, R. Liebl, G. Theodoridis, M. Witschel, Protoporphyrinogen IX oxidase inhibitors, in: P. Jeschke, M. Witschel, W. Kraemer, U. Schirmer (Eds.), Modern Crop Protection Compounds, 3rd Edition, Weinheim, 2019, p. 173-211 Epyrifenacil has IUPAC name "Acetic acid, 2-[[3-[2-chloro-5-[3,6-dihydro-3-methyl-2,6-dioxo-4-(trifluoromethyl)-1(2H)-pyrimidinyl]-4-fluorophenoxy]-2-pyridinyl]oxy]-, ethyl ester" (CAS Number 353292-31-6), and it is known from EP1122244. Epyrifenacil was earlier known as S-3100.

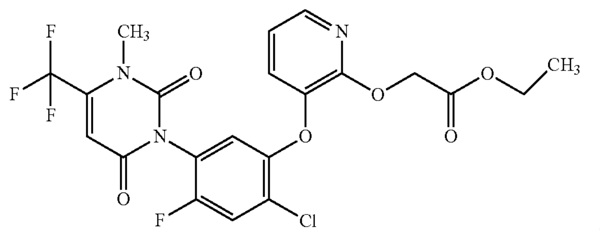

(Epyrifenacil)

WO 2019030098 discloses herbicidal mixtures comprising L-glufosinate and protoporphyrinogen-IX oxidase inhibitors without differentiating between the application of glufosinate or its L-isomer, and thereby also not varying accordingly the specific rates of application for glufosinate or L-glufosinate and PPO inhibitor. The disclosure therein relates especially to methods for controlling undesirable vegetation in burndown programs, in industrial vegetation management and forestry, in vegetable and perennial crops and in turf and lawn.

WO2017007873 discloses herbicidal mixture for glyphosate-resistant volunteer corn control and these mixture appears to be principally directed to combinations of glyphosate with one of three uracil based compound without differentiating between the application of glufosinate or its L-isomer, and thereby also not varying accordingly the specific rates of application for glufosinate or L-glufosinate and PPO inhibitor.

Prior art publications WO2019030086, WO2019030091, WO2019030095, WO2019030097 and EP 1122244 A1 generally describe Glufocinate/L-Glufocinate and/or PPO inhibitors or mixture thereof. However, none of the cited document disclose the combination of the present invention with specific mixture ratios and any synergistic effect associated with it.

However, although combinations of (L-)glufosinate with protoporphyrinogen-IX oxidase inhibitors have been described in general, the application of specific ratios of the two compounds, (L)glufosinate and epyrifenacil and their efficacy have not yet been disclosed and discussed to the extend as can be shown for the present invention.

It has now surprisingly been found that the application of specific ratios of the two compounds, (L-)glufosinate and epyrifenacil, can achieve unexpectedly synergistic results in their herbicidal activity, especially if the ratio of (L-)glufosinate being present is considerably higher compared to the ratio of the protoporphyrinogen-IX oxidase inhibitor.

Furthermore, if the absolute rate of (L-)glufosinate being applied is in a certain ratio higher compared to the absolute rate of the protoporphyrinogen-IX oxidase inhibitor being applied, then the absolute conventionally applied rate of the PPO-inhibitor can be significantly lowered.

For example, if the PPO inhibitor would conventionally be applied in an absolute rate of approximately 25 g/ha, then this rate can be lowered down to 60%, meaning that by combining the PPO inhibitor with (L)glufosinate, the absolute application rate of the PPO inhibitor could go down to 15 g/ha. From agricultural aspects, this would be desirable. However, the observed effects may vary depending on the crops, which are treated.

In their application, herbicidal crop protection agents (herbicides) known to date for controlling harmful plants or unwanted vegetation, e.g. in permanent crops or on permanent cropland, have some disadvantages, be it (I) that they have no or else insufficient herbicidal activity against specific harmful plants, (II) that the spectrum of harmful plants which can be controlled with the herbicides is not broad enough, (III) that the selectivity of herbicides in and the compatibility with (young) plantation crops is too low, thereby causing unwanted damage and/or unwanted reduced harvest yields of the (young) plantation crops, (IV) that the initial herbicidal activity is not high or not strong enough and/or (V) that the herbicidal activity does not last long enough.

Overall, the herbicidal activity, i.e. one or more of the above aspects (I), (II) (III), (IV) and/or (V) of the herbicides like (L-)glufosinate (and/or agronomically acceptable salts thereof) used so far still allow some improvement, and although the combination with other herbicides for achieving such improvements is known, it is still surprising and non-obvious, that the fine-tuning of ratios of known herbicidal combinations may still exhibit an improved herbicidal activity and may be able to control harmful plants or unwanted vegetation in an even more effective and more efficient manner than expected.

The present invention primarily relates to a combination of herbicides, or to a "herbicide combination" of (i) glufosinate, especially L-glufosinate, and/or agronomically acceptable salts thereof, and (ii) epyrifenacil, wherein the ratio by weight of the total amount of component (i) is at least 40 times more than the total amount of component (ii) in case (i) is glufosinate and/or agronomically acceptable salts thereof, and at least 20 times more in case (i) is L-glufosinate and/or agronomically acceptable salts thereof.

The present invention preferably relates to a combination of herbicides, or to a "herbicide combination" of (i) glufosinate, especially L-glufosinate, and/or agronomically acceptable salts thereof, and (ii) epyrifenacil, wherein the ratio by weight of the total amount of component (i) is at least 100 times more than the total amount of component (ii) in case (i) is glufosinate and/or agronomically acceptable salts thereof, and at least 50 times more in case (i) is L-glufosinate and/or agronomically acceptable salts thereof.

The present invention relates to a combination of herbicides, or to a "herbicide combination" of (i) glufosinate, especially L-glufosinate, and/or agronomically acceptable salts thereof, and a (ii) epyrifenacil, wherein the ratio by weight of the total amount of component (i) compared to the total amount of component (ii) is at maximum 1000 times higher in case (i) is glufosinate and/or agronomically acceptable salts thereof, and at maximum 500 times higher in case (i) is L-glufosinate and/or agronomically acceptable salts thereof.

The present invention preferably relates to a combination of herbicides, or to a "herbicide combination" of (i) glufosinate, especially L-glufosinate, and/or agronomically acceptable salts thereof, and a (ii) epyrifenacil, wherein the ratio by weight of the total amount of component (i) compared to the total amount of component (ii) is at maximum 500 times higher in case (i)

is glufosinate and/or agronomically acceptable salts thereof, and at maximum 250 times higher in case (i) is L-glufosinate and/or agronomically acceptable salts thereof.

When reference is made to specific ratios and values of glufosinate, the assumption is made, that glufosinate is a racemic mixture of the D-enantiomer (50%) and the L-enantiomer (50%).

When reference is made to specific ratios and values of L-glufosinate, the assumption is made, that L-glufosinate is present in enantio-enriched (>50% L-glufosinate) or enantio-pure (100% L-glufosinate) form, preferably with an enantiomer ratio of at least 80% L-glufosinate and no more than 20% D-glufosinate, more preferably at least 90% L-glufosinate and no more than 10% D-glufosinate, and even more preferably at least 95% L-glufosinate and no more than 5% D-glufosinate.

The ratio by weight of the total amount of component (i) to the total amount of component (ii) in a herbicide combination according to the present invention is in the range of from 2,000:1 to 125:1 and even more preferably in the range of from 1,200:1 to 250:1 if (i) is glufosinate (and/or agronomically acceptable salts thereof), and in the range of from 800:1 to 40:1 and even more preferably in the range of from 600:1 to 125:1 if (i) is L-glufosinate (and/or agronomically acceptable salts thereof).

More preferably, the ratio by weight of the total amount of component (i) to the total amount of component (ii) in a herbicide combination according to the present invention is in the range of from 1000:1 to 50:1 and even more preferably in the range of from 500:1 to 60:1 if (i) is glufosinate (and/or agronomically acceptable salts thereof), and in the range of from 500:1 to 25:1 and even more preferably in the range of from 250:1 to 30:1 if (i) is L-glufosinate (and/or agronomically acceptable salts thereof).

Further, the present invention also relates to a composition comprising a herbicide combination as defined hereinabove or hereinafter.

Therefore, the ratio by weight of the total amount of component (i) to the total amount of component (ii) in a herbicide combination according to the present invention show surprisingly unexpected results in the efficacy of the herbicidal activity, and is therefore defined according in the ranges outlined above The herbicide combinations and the compositions comprising said herbicide combinations in accordance with the present invention exhibit an excellent herbicidal activity in controlling harmful plants or unwanted vegetation.

It has been found that the efficacy of epyrifenacil can be improved by combining epyrifenacil with (L-)glufosinate and/or agronomically acceptable salts thereof in the ratio by weight as specified in the context of the present invention.

The (use of a) herbicide combination according to the present invention and the (use of a) composition comprising the herbicide combination as defined in the context of the present invention show remarkably higher/stronger initial herbicidal activity (see above mentioned aspect (IV)) than the individual components alone.

The (use of a) herbicide combination according to the present invention and the (use of a) composition comprising the herbicide combination as defined in the context of the present invention show remarkably longer lasting herbicidal activity (see above mentioned aspect (V)) than epyrifenacil or L-glufosinate and/or agronomically acceptable salts thereof alone. For example, said longer lasting herbicidal activity results in the substantial retardation or substantial suppression of regrowth of the harmful or undesired plants and/or substantial retardation or substantial suppression of germination of the harmful or undesired plants.

The (use of a) herbicide combination according to the present invention and the (use of a) composition comprising the herbicide combination as defined in the context of the present invention is characterized by an overall more rapidly commencing (i.e. earlier and faster) and a more long-lasting herbicidal action, in comparison to epyrifenacil or L-glufosinate and/or agronomically acceptable salts thereof alone, when applied to harmful or undesired plants, parts of said harmful or undesired plants, or the area where the harmful or undesired plants grow, for example the area under cultivation, especially in post-emergence application.

Nevertheless, also epyrifenacil (component (ii) as defined in the context of the present invention) enhances, extends, and/or prolongs the herbicidal activity of L-glufosinate and/or agronomically acceptable salts thereof (component (i) as defined in the context of the present invention).

The (use of a) herbicide combination according to the present invention and the (use of a) composition comprising the herbicide combination as defined in the context of the present invention also allow good selectivity in and the compatibility with (young) plantation crops (see above mentioned aspect (III)), thereby avoiding or reducing unwanted damage and/or unwanted reduced harvest yields of the (young) plantation crops.

If a herbicide combination (used) according to the present invention or if a composition comprising the herbicide combination (used) in the context of the present invention is applied to the green parts of the harmful plants or undesired plants, growth likewise stops drastically a very short time after the treatment; typically, they die completely after a certain time, so that in this manner competition by the weeds, which is harmful to the (permanent) crops, is eliminated at a very early point in time and in a sustained manner.

The present invention also relates to a composition as defined herein in the context of the present invention which additionally comprises one or more further components selected from the group consisting of formulation auxiliaries as well as additives customary in crop protection, and, optionally, further agrochemically active compounds (i.e. agrochemically active compounds different from components (i) and (ii) as defined above, i.e. agrochemically active compounds other than (i) glufosinate and/or agronomically acceptable salts, L-glufosinate and agronomically acceptable salts thereof and (ii) epyrifenacil).

However, when a combination of herbicides used in the context of the present invention consists of herbicides (i) glufosinate/L-glufosinate and/or agronomically acceptable salts thereof and (ii) epyrifenacil, this means that in such a case the combination of herbicides used in the context of the present invention or the composition comprising said combination of herbicides used in the context of the present invention does not contain any further (i.e. no additional) herbicidal active ingredient, and preferably does not contain any further agrochemically active compound. Such combinations of herbicides consisting of (i) glufosinate/L-glufosinate and/or agronomically acceptable salts thereof (L-glufosinate-ammonium being preferred) and (ii) epyrifenacil are particularly preferred in the context of the present invention.

In this context, the term "further herbicidal active ingredient" and "further agrochemically active compound" refers to the herbicides and agrochemically active compounds (pesticides), respectively, listed in "The Pesticide Manual", 16th edition, The British Crop Protection Council and the Royal Soc. of Chemistry, 2012 other than glufosinate and agronomically acceptable salts, L-glufosinate and agronomically acceptable salts thereof, and epyrifenacil.

According to the present invention, the total amount of component (i) is between 100 and 600 g/L (g/L=gram per litre), more preferably between 150 and 500 g/L, in each case based on the total amount of the composition.

According to the present invention, the total amount of component (ii) is in the range of from 0.05 to 6 g/L, preferably in the range of from 0.15 to 2 g/L, if (i) is glufosinate (and/or agronomically acceptable salts thereof), and in the range from 0.1 to 12 g/L, preferably in the range of from 0.3 to 4 g/L, if (i) is L-glufosinate (and/or agronomically acceptable salts thereof), in each case based on the total amount of the composition.

In a preferred composition according to the present invention, the total amount of component (ii) is in the range of from 0.15 to 15 g/L, preferably in the range of from 0.2 to 10 g/L, if (i) is glufosinate (and/or agronomically acceptable salts thereof), and in the range from 0.2 to 30 g/L, preferably in the range of from 0.4 to 20 g/L, if (i) is L-glufosinate (and/or agronomically acceptable salts thereof), in each case based on the total amount of the composition.

Thus, a composition according to the present invention is a composition, wherein the total amount of component (i) is in the range from 100 to 600 g/L, preferably in the range from 150 to 500 g/L, and the total amount of component (ii) is in the range of from 0.05 to 6 g/L, preferably in the range of from 0.15 to 2 g/L, if (i) is glufosinate (and/or agronomically acceptable salts thereof), and in the range from 0.1 to 12 g/L, preferable in the range from 0.3 to 4 g/L, if (i) is L-glufosinate (and/or agronomically acceptable salts thereof).

Preferably, a composition according to the present invention is a composition, wherein the total amount of component (i) is in the range from 100 to 600 g/L, preferably in the range from 150 to 500 g/L, and the total amount of component (ii) is in the range of from 0.15 to 15 g/L, preferably in the range of from 0.2 to 10 g/L, if (i) is glufosinate (and/or agronomically acceptable salts thereof), and in the range from 0.2 to 30 g/L, preferable in the range from 0.4 to 20 g/L, if (i) is L-glufosinate (and/or agronomically acceptable salts thereof).

The present invention preferably relates to the use of a combination of herbicides or to the use of a composition comprising a combination of herbicides as defined in the context of the present invention, in or on permanent cropland, or on permanent crops.

A permanent crop is one produced from plants which last for many seasons, rather than being replanted after each harvest. Permanent crops are grown on permanent crop land in the form of agricultural land that includes grasslands and shrublands, e.g. used to grow grape vines or coffee; orchards used to grow fruit or olives; and forested plantations, e.g. used to grow nuts or rubber. It does not include, however, tree farms intended to be used for wood or timber.

Preferred permanent croplands in the context of the present invention are plantations, grasslands and shrublands. Preferably, the permanent crops in the context of the present invention are plantation crops, and preferably are selected from the group consisting fruit crops and orchard crops (preferably fruit trees, citrus trees, mango trees, olive trees, grape vines, coffee, cocoa, tea, and berries (such as strawberries, raspberries, blueberries and currants)), Musaceae sp. crops (for example banana or plantain crops), nut trees (preferably almond trees, walnut trees, pistachio trees, pecan trees, hazelnut trees), oil palm trees, rubber trees, sugarcane and cotton.

More preferably, the permanent crops in the context of the present invention are fruit trees (preferably pome fruit trees and stone fruit trees; preferred fruit trees are apple trees, pear trees, apricot trees, plum trees, cherry trees, peach trees), olive trees, grape vines, coffee, tea), Musaceae sp. crops (preferably banana crops or plantain crops), nut trees (preferably almond trees, walnut trees, pistachio trees, pecan trees, hazelnut trees), oil palm trees, rubber trees, and citrus crops (preferably lemon, orange or grapefruit crops).

Even more preferably, the permanent crops in the context of the present invention are selected from the group consisting of apple trees, pear trees, apricot trees, plum trees, cherry trees, peach trees, olive trees, grape vines, coffee, tea, banana crops, nut trees (preferably almond trees, walnut trees, pistachio trees), oil palm trees, rubber trees, and citrus crops (preferably lemon, orange or grapefruit crops).

Particularly preferably, the permanent crops in the context of the present invention are selected from the group consisting of apple trees, pear trees, apricot trees, plum trees, cherry trees, peach trees, olive trees, grape vines, coffee, tea, banana crops, almond trees, walnut trees, oil palm trees, rubber trees, lemon crops, orange crops and grapefruit crops The present invention preferably also relates to the use of a combination of herbicides or to the use of a composition comprising a combination of herbicides as defined in the context of the present invention on row crops and as well on specialty crops.

Row crops can be planted in rows wide enough to allow it to be tilled or otherwise cultivated by agricultural machinery, machinery tailored for the seasonal activities of row crops. The particularity of row crops is that they are planted and cultivated on a seasonal or yearly basis. Therefore, such crops yield products and profit relatively quickly and predictably. A row crop is one produced from plants which last for many seasons, rather than being re-planted after each harvest. Examples of row crops include soybeans, corn, canola, cotton, cereals or rice, but as well sunflower, potato, dry bean, field pea, flax, safflower, buckwheat and sugar beets.

Mixtures of (L-)glufosinate or its salt and a PPO-inhibitor epyrifenacil as herbicidal compound II show enhanced herbicide action against undesirable vegetation in pre-plant burn-down prior to planting of conventional soybeans and soybeans that are tolerant against herbicides including glufosinate and in post-emergence use in glufosinate tolerant soybeans and/or show superior compatibility with soybeans, i.e. their use leads to a reduced damage of the soybean plants and/or does not result in increased damage of the soybean plants, if compared to L-glufosinate or its salts alone.

The abovementioned properties and advantages are necessary under practical weed control conditions to keep the soybeans free from undesired competing plants and thus to guarantee and/or increase the yields from the qualitative and quantitative point of view. These novel combinations markedly exceed the technical state of the art with a view to the properties described.

While the active compounds of the inventive mixtures have an outstanding herbicidal activity against monocotyledonous and dicotyledonous weeds, the tolerant, or cross-tolerant, glufosinate tolerant soybeans are damaged only to a minor extent, or not at all.

Tolerant or resistant soybean varieties (e.g. transgenic soybean varieties) provide the option to use herbicides, which are originally not selective, in respective tolerant or resistant soybeans in addition to conventional weed control system. One example is glufosinate which can not only be used for pre-plant burn-down both in conventional soybeans and soybeans that are tolerant against herbicides including glufosinate; but which can also achieve effective weed control by post-emergence application in glufosinate tolerant soybeans. Glufosinate is a broad-spectrum herbicide that controls most grass and broadleaf herbicide species; however, there are a few tough to control species or resistant biotypes that it does not fully control. Another challenge is the duration of action, or the degradation rate of the herbicide. Furthermore, changes in the sensitivity of harmful plants, which may occur upon prolonged use of the herbicides or within a geographical limited area, must also be taken into consideration. The resulting loss of action against individual plants can sometimes compensated for to a certain extent by higher application rates of the herbicides. However, there is always a demand for methods to achieve the herbicidal effect with lower application rates of active compounds to reduce not only the amount of an active compound required for application, but also the amount of formulation auxiliaries. Thus, low application rates are for economic and environmental reasons an object eco-friendliness of the herbicide treatment.

Hence, as mentioned above, the inventive mixtures are suitable for controlling a large number of harmful plants in glufosinate tolerant soybeans.

Thus, the term "glufosinate tolerant soybeans" as used herein includes also (soybean) plants which have been modified by mutagenesis, genetic engineering or breeding and mutation selection techniques in order to provide a new trait to a plant or to modify an already present trait.

Mutagenesis includes techniques of random mutagenesis using X-rays or mutagenic chemicals, but also techniques of targeted mutagenesis, in order to create mutations at a specific locus of a plant genome. Targeted mutagenesis techniques frequently use oligonucleotides or proteins like CRISPR/Cas, zinc-finger nucleases, TALENs or meganucleases to achieve the targeting effect.

Genetic engineering usually uses recombinant DNA techniques to create modifications in a plant genome which under natural circumstances cannot readily be obtained by cross breeding, mutagenesis or natural recombination. Typically, one or more genes are integrated into the genome of a plant in order to add a trait or improve a trait. These integrated genes are also referred to as transgenes in the art, while plant comprising such transgenes are referred to as transgenic plants. The process of plant transformation usually produces several transformation events, which differ in the genomic locus in which a transgene has been integrated. Plants comprising a specific transgene on a specific genomic locus are usually described as comprising a specific "event", which is referred to by a specific event name.

Glufosinate tolerance has been created by using mutagenesis as well as using genetic engineering. Transgenic soybean events comprising glufosinate tolerance genes are for example, but not excluding others, A2704-12 (event code: ACS-GMØØ5-3, gene: pat, e.g. commercially available as Liberty Link™ soybean), A2704-21 (event code: ACS-GMØØ4-2, gene: pat, e.g. commercially available as Liberty Link™ soybean), A5547-127 (event code: ACS-GMØØ6-4, gene: pat, e.g. commercially available as Liberty Link™ soybean), A5547-35 (event code: ACS-GMØØ8-6, gene: pat, e.g. commercially available as Liberty Link™ soybean), GU262 (event code: ACS-GMØØ3-1, gene: pat, e.g. commercially available as Liberty Link™ soybean), W62 (event code: ACS-GMØØ2-9, gene: pat, e.g. commercially available as Liberty Link™ soybean), W98 (event code: ACS-GMØØ1-8, gene: pat, e.g. commercially available as Liberty Link™ soybean), DAS68416-4 (event code: DAS-68416-4, gene: pat, e.g. commercially available as Enlist™ Soybean), DAS44406-6 (event code: DAS-44406-6, gene: pat), DAS68416-4×MON89788 (event code: DAS-68416-4×MON-89788-1, gene: pat), SYHTØH2 (event code: SYN-ØØØH2-5, gene: pat), DAS81419×DAS44406-6 (event code: DAS-81419-2×DAS-444Ø6-6, gene: pat) and FG72×A5547-127 (event code: MST-FGØ72-3×ACS-GMØØ6-4, gene: pat).

In other aspects, soybeans of the invention include those plants which have been subjected to genetic modifications other than glufosinate tolerance by breeding, mutagenesis or genetic engineering, e.g. have been rendered tolerant to applications of specific other classes of herbicides, such as PPO inhibitors (e.g. saflufenacil, trifludimoxazin), AHAS inhibitors; auxinic herbicides such as dicamba or 2,4-D; bleaching herbicides such as hydroxyphenylpyruvate dioxygenase (HPPD) inhibitors (e.g. isoxaflutol, mesotrione, tembotrione, topramezone, bicyclopyrone) or phytoene desaturase (PDS) inhibitors; EPSPS inhibitors such as glyphosate; glutamine synthetase (GS) inhibitors such as glufosinate; lipid biosynthesis inhibitors such as acetyl CoA carboxylase (ACCase) inhibitors such as "dims" {e.g., cycloxydim, sethoxydim, clethodim, or tepraloxydim), "fops" {e.g., clodinafop, diclofop, fluazifop, haloxyfop, or quizalofop), and "dens" (such as pinoxaden); or oxynil {i.e. bromoxynil or ioxynil) herbicides as a result of conventional methods of breeding or genetic engineering, Thus, soybeans of the invention can be made resistant to multiple classes of herbicides through multiple genetic modifications, such as for example resistance to both glyphosate and dicamba (e.g. Xtend® soybeans); glyphosate, 2,4-D and "fop" herbicides (e.g. Enlist® soybeans); glyphosate and glufosinate; glyphosate and HPPD inhibitors such as isoxaflutol (e.g. GT27® soybeans, Balance® GT soybeans); glyphosate, glufosinate and HPPD inhibitors such as isoxaflutol (e.g. FG72×LL55 soybeans); glufosinate and HPPD inhibitors such as isoxaflutol or mesotrione (e.g. MGI soybeans); glyphosate, glufosinate, dicamba and HPPD inhibitors such as isoxaflutol or mesotrione; glyphosate, dicamba and glufosinate; glyphosate and PPO inhibitors; glufosinate and PPO inhibitors; glyphosate, glufosinate and PPO inhibitors; glyphosate, dicamba and PPO inhibitors; glyphosate, 2,4-D, "fop" herbicides and PPO inhibitors; glyphosate, dicamba, glufosinate and PPO inhibitors; glyphosate, 2,4-D, "fop" herbicides, glufosinate and PPO inhibitors; glyphosate, PPO inhibitors and HPPD inhibitors; glufosinate, HPPD inhibitors and PPO inhibitors; glyphosate, glufosinate, HPPD inhibitors and PPO inhibitors; glyphosate, dicamba, HPPD inhibitors and PPO inhibitors; glyphosate, 2,4-D, "fop" herbicides, HPPD inhibitors and PPO inhibitors; glyphosate, dicamba, glufosinate, HPPD inhibitors and PPO inhibitors; glyphosate, 2,4-D, "fop" herbicides, glufosinate, HPPD inhibitors and PPO inhibitors; or to one of the aforementioned soybeans that are tolerant to further classes of herbicides such as AHAS inhibitors or ACCase inhibitors. These herbicide resistance technologies are, for example, described in Pest Management Science (at volume, year, page): 61, 2005, 246; 61, 2005, 258; 61, 2005, 277; 61, 2005, 269; 61, 2005, 286; 64, 2008, 326; 64, 2008, 332; Weed Science 57, 2009, 108; Australian Journal of Agricultural Research 58, 2007, 708; Science 316, 2007, 1185; and references quoted therein.

In addition to these classes of inhibitors, soybeans of the invention may also be tolerant to herbicides having other modes of action, for example, chlorophyll/carotenoid pigment inhibitors, cell membrane disrupters, photosynthesis inhibitors, cell division inhibitors, root inhibitors, shoot inhibitors, and combinations thereof.

Such additional tolerance traits may be expressed, e.g.: as mutant or wildtype PPO proteins, as mutant AHASL proteins, mutant ACCase proteins, mutant EPSPS proteins, or mutant glutamine synthetase proteins; or as mutant native, inbred, or transgenic aryloxyalkanoate dioxygenase (AAD or DHT), haloarylnitrilase (BXN), 2,2-dichloropropionic acid dehalogenase (DEH), glyphosate-N-acetyltransferase (GAT), glyphosate decarboxylase (GDC), glyphosate oxidoreductase (GOX), glutathione-S-transferase (GST), phosphinothricin acetyltransferase (PAT or bar), or CYP450s proteins having an herbicide-degrading activity.

Glufosinate tolerant soybeans hereof can also be stacked with other traits including, but not limited to, pesticidal traits such as Bt Cry and other proteins having pesticidal activity toward coleopteran, lepidopteran, nematode, or other pests; nutrition or nutraceutical traits such as modified oil content or oil profile traits, high protein or high amino acid concentration traits, and other trait types known in the art.

Specialty crops are to be understood as fruits, vegetables or other specialty or plantation permanent crops such as trees, nuts, vines, (dried) fruits, ornamentals, oil palm, banana, rubber, sugarcane and the like, Horticulture and nursery crops, including floriculture, may also fall under the definition of specialty crops. Vegetable crops includes for example aubergine, beans, bell pepper, cabbage, chili, cucumber, eggplant, lettuce, melon, onion, potato, sweet potato, spinach and tomato. Plants being considered specialty crops are in general intensively cultivated. For weed control in vegetable crops, it may be desirable to shield the crops from contact with the spray solution that contains the herbicidal mixture according to the present invention.

In general, the crops which may be treated according to the present invention, may be of conventional origin or may be herbicide tolerant crops.

According to the present invention the expression "composition" includes compositions comprising a herbicide combination as defined herein, and can be used in various acceptable or agronomically typical forms and formulations, for example in a single "ready-mix" form.

The herbicides (i) and (ii) used in the herbicide combinations used in the context of the present invention and the compositions comprising the herbicide combinations used in the context of the present invention may be a combined spray mixture composed from separate formulations of the single active compounds, such as a "tank-mix", or said composition can be a combined use of the single active ingredients when applied in a sequential manner, i.e. one after the other within a reasonably short period, such as a few hours (and preferably less than 24 hours).

In a particularly preferred embodiment, the herbicides (i) and (ii) as defined herein are used together, i.e. at the same time. Thus, in a particularly preferred embodiment, the compositions as defined in the context of the present invention are used.

Preferably, the combination of herbicides according to the present invention (preferably in one of the preferred embodiments defined herein) and the compositions according to the present invention (preferably in one of the preferred embodiments defined herein) are easily and readily obtained, by combining the components (i) and (ii) in the ratio by weight as defined in the context of the present invention, for example by mixing the appropriate amounts if components (i) and (ii).

Thus, in a further aspect, the present invention relates to a method for producing a combination of herbicides according to the present invention (preferably in one of the preferred embodiments defined herein) and to a method of producing the compositions according to the present invention (preferably in one of the preferred embodiments defined herein), comprising the steps of (a) providing component (i), (b) providing component (ii), and (c) combining component (i) and component (ii), such that a combination of herbicides according to the present invention (preferably in one of the preferred embodiments defined herein) or a composition according to the present invention (preferably in one of the preferred embodiments defined herein) is obtained.

As mentioned above, the effects observed when using the herbicide combinations as defined according to the present invention or the compositions according to the present invention allow a more potent herbicidal action (in particular a higher/stronger initial herbicidal activity), an extended herbicidal activity period and/or a reduced number of required individual applications and—as a result—more advantageous weed control systems both from an economical and ecological point of view.

In a preferred embodiment, the herbicide combination (used) in accordance with the present invention or the composition comprising the herbicides (i) and (ii) (used) in accordance with the present invention is applied once, twice or three times per Gregorian calendar year, i.e. in one application, in two applications or in three applications per year according to the Gregorian calendar.

In a preferred embodiment, the herbicide combination (used) in accordance with the present invention or the composition comprising the herbicides (i) and (ii) (used) in accordance with the present invention is applied twice per Gregorian calendar year, i.e. in two applications per year according to the Gregorian calendar.

In an alternatively preferred embodiment, the herbicide combination (used) in accordance with the present invention or the composition comprising the herbicides (i) and (ii) (used) in accordance with the present invention is applied one time per Gregorian calendar year, i.e. in one application per year according to the Gregorian calendar.

In a preferred embodiment, the herbicide combination (used) in accordance with the present invention or the composition comprising the herbicides (i) and (ii) (used) in accordance with the present invention is applied one time in about 12 months, i.e. in one application in about 12 months.

In an alternative preferred embodiment, the herbicide combination (used) in accordance with the present invention or the composition comprising the herbicides (i) and (ii) (used) in accordance with the present invention is applied between one and ten times per Gregorian calendar year, i.e. in up to ten applications per year according to the Gregorian calendar. This alternative preferred method is of particular usefulness in permanent crops, in particular those grown under tropical conditions; in which case weeds grow vigorously at any time of the year, and herbicide applications are to be repeated as soon as the previous treatment loses its effectiveness and weeds start to regrow.

The herbicide combinations according to the present invention and the compositions comprising the herbicides (i) and (ii) as defined in the context of the present invention are preferably used in post-emergence applications.

The combination of herbicides as defined in the context of the present invention or the composition according to the present invention have an outstanding herbicidal activity against a broad spectrum of economically important harmful monocotyledonous and dicotyledonous harmful plants. Also here, post-emergence application is preferred.

Specifically, examples may be mentioned of some representatives of the monocotyledonous and dicotyledonous weed flora which can be controlled by the combinations according to the invention, without the enumeration being a restriction to certain species.

In the context of the present text, reference may be made to growth stages according to the BBCH monograph "Growth stages of mono- and dicotyledonous plants", $2^{nd}$ edition, 2001, ed. Uwe Meier, Federal Biological Research Centre for Agriculture and Forestry (Biologische Bundesanstalt für Land und Forstwirtschaft).

Examples of monocotyledonous harmful plants on which the herbicidal combinations and compositions according to the present invention act efficiently are from amongst the genera *Hordeum* spp., *Echinochloa* spp., *Poa* spp., *Bromus* spp., *Digitaria* spp., *Eriochloa* spp., *Setaria* spp., *Pennisetum* spp., *Eleusine* spp., *Eragrostis* spp., *Panicum* spp., *Lolium* spp., *Brachiaria* spp., *Leptochloa* spp., *Avena* spp., *Cyperus* spp., *Axonopris* spp., *Sorghum* spp., and *Melinus* spp.

Particular examples of monocotyledonous harmful plants species on which the herbicidal combinations and compositions according to the present invention act efficiently are selected from from amongst the species *Hordeum murinum, Echinochloa crus-galli, Poa annua, Bromus rubens* L., *Bromus rigidus, Bromus secalinus* L., *Digitaria sanguinalis, Digitaria insularis, Eriochloa* gracilis, *Setaria faberi, Setaria viridis, Pennisetum glaucum, Eleusine indica, Eragrostis pectinacea, Panicum miliaceum, Lolium multiflorum, Brachiaria platyphylla, Leptochloa fusca, Avena fatua, Cyperus compressus, Cyperus esculentes, Axonopris offinis, Sorghum halapense*, and *Melinus repens*.

In a preferred embodiment, the herbicidal combinations and compositions according to the present invention are used to control monocotyledonous harmful plant species, more preferably monocotyledonous plants of the species *Echinochloa* spp., *Digitaria* spp., *Setaria* spp., *Eleusine* spp. and *Brachiarium* spp.

Examples of dicotyledonous harmful plants on which the herbicidal combinations and compositions according to the present invention act efficiently are from amongst the genera *Amaranthus* spp., *Erigeron* spp., *Conyza* spp., *Polygonum* spp., *Medicago* spp., *Mollugo* spp., *Cyclospermum* spp., *Stellaria* spp., *Gnaphalium* spp., *Taraxacum* spp., *Oenothera* spp., *Amsinckia* spp., *Erodium* spp., *Erigeron* spp., *Senecio* spp., *Lamium* spp., *Kochia* spp., *Chenopodium* spp., *Lactuca* spp., *Malva* spp., *Ipomoea* spp., *Brassica* spp., *Sinapis* spp., *Urtica* spp., *Sida* spp, *Portulaca* spp., *Richardia* spp., *Ambrosia* spp., *Calandrinia* spp., *Sisymbrium* spp., *Sesbania* spp., *Capsella* spp., *Sonchus* spp., *Euphorbia* spp., *Helianthus* spp., *Coronopus* spp., *Salsola* spp., *Abutilon* spp., *Vicia* spp., *Epilobium* spp., *Cardamine* spp., *Picris* spp., *Trifolium* spp., *Galinsoga* spp., *Epimedium* spp., *Marchantia* spp., *Solanum* spp., *Oxalis* spp., *Metricaria* spp., *Plantago* spp., *Tribulus* spp., *Cenchrus* spp. *Bidens* spp., *Veronica* spp., and *Hypochaeris* spp.

Particular examples of dicotyledonous harmful plants species on which the herbicidal combinations and compositions according to the present invention act efficiently are selected from from amongst the species *Amaranthus spinosus, Polygonum convolvulus, Medicago* polymorpha, *Mollugo verticillata, Cyclospermum leptophyllum, Stellaria media, Gnaphalium purpureum, Taraxacum officinale, Oenothera laciniata, Amsinckia intermedia, Erodium cicutarium, Erodium moschatum, Erigeron bonariensis* (*Conyza bonariensis*), *Senecio vulgaris, Lamium amplexicaule, Erigeron canadensis, Polygonum aviculare, Kochia scoparia, Chenopodium album, Lactuca serriola, Malva parviflora, Malva neglecta, Ipomoea hederacea, Ipomoea lacunose, Brassica nigra, Sinapis arvensis, Urtica dioica, Amaranthus blitoides, Amaranthus retroflexus, Amaranthus hybridus, Amaranthus lividus, Sida spinosa, Portulaca oleracea, Richardia scabra, Ambrosia artemisiifolia, Calandrinia caulescens, Sisymbrium irio, Sesbania exaltata, Capsella bursapastoris, Sonchus oleraceus, Euphorbia maculate, Helianthus annuus, Coronopus didymus, Salsola tragus, Abutilon theophrasti, Vicia benghalensis L., Epilobium paniculatum, Cardamine* spp, *Picris echioides, Trifolium* spp., *Galinsoga* spp., *Epimedium* spp., *Marchantia* spp., *Solanum* spp., *Oxalis* spp., *Metricaria matriccarioides, Plantago* spp., *Tribulus terrestris, Salsola kali, Cenchrus* spp., *Bidens bipinnata, Veronica* spp., and *Hypochaeris radicata*.

In a preferred embodiment, the herbicidal combinations and compositions according to the present invention are used to control dicotyledonous harmful plant species, more preferably dicotyledonous plants of the species *Amaranthus* spp., *Erigeron* spp., *Conyza* spp., *Kochia* spp. and *Abutilon* spp.

If the herbicide combinations according to the present invention and the compositions according to the present invention are applied post-emergence to the green parts of the plants, growth likewise stops drastically a very short time after the treatment and the weed plants remain at the growth stage of the point of time of application, or they die completely after a certain time, so that in this manner competition by the weeds, which is harmful to the crops, is eliminated at a very early point in time and in a sustained manner.

The herbicide combinations according to the present invention and the compositions according to the present invention are characterized by a rapidly commencing and long-lasting herbicidal action. As a rule, the rainfastness of the active compounds in the herbicide combinations according to the present invention is advantageous. A particular advantage is that the dosages of the herbicides (i) and (ii) as defined in the context of the present invention can be adjusted to such a low quantity that their soil action is low. This also allows them to be employed in sensitive crops (such as (young) plantation crops). Also, the combination of herbicides (i) and (ii) as defined in the context of the present invention allows the application rate of the herbicides (i) and (ii) required to be reduced.

In particular when the herbicide combinations as defined in the context of the present invention and the compositions comprising a herbicide combination as defined in the context of the present invention are employed application rates may be reduced, a broader spectrum of broadleaved weeds and grass weeds maybe controlled, the herbicidal action may take place more rapidly, the duration of action may be longer, the harmful plants may be controlled better while using only one, or few, applications, and the application period which is possible to be extended.

The abovementioned properties and advantages are of benefit for weed control practice to keep agricultural crops free from undesired competing plants and thus to safeguard and/or increase the yields from the qualitative and/or quantitative point of view. These novel combinations markedly exceed the technical state of the art with a view to the properties described.

Owing to their herbicidal and plant-growth-regulatory properties, the compositions according to the present invention can be employed for controlling harmful plants in genetically modified crops or crops obtained by mutation/selection. These crops are distinguished as a rule by particular, advantageous properties, such as resistances to herbicidal compositions or resistances to plant diseases or causative agents of plant diseases such as particular insects or microorganisms such as fungi, bacteria or viruses. Other particular properties relate, for example, to the harvested material with regard to quantity, quality, storability, composition and specific constituents. Thus, for example, transgenic plants are known whose starch content is increased or whose starch quality is altered, or those where the harvested material has a different fatty acid composition.

The present invention also relates to a method of controlling undesired vegetation (e.g. harmful plants), which comprises applying a herbicide combination and compositions as defined in the context of the present invention or applying a composition as defined in the context of the present invention, preferably by the post-emergence method, to harmful or undesired plants, parts of said harmful or undesired plants, or the area where the harmful or undesired plants grow, for example the area under cultivation.

In the context of the present invention "controlling" denotes a significant reduction of the growth of the harmful plant(s) in comparison to the untreated harmful plants. Preferably, the growth of the harmful plant(s) is essentially diminished (60-79%), more preferably the growth of the harmful plant(s) is largely or fully suppressed (80-100%), and in particular the growth of the harmful plant(s) is almost fully or fully suppressed (90-100%).

Thus, in a further aspect, the present invention relates to a method for controlling undesired plant growth, and/or controlling harmful plants, comprising the step of applying a combination of herbicides according to the present invention (preferably in one of the preferred embodiments defined herein) or a composition according to the present invention (preferably in one of the preferred embodiments defined herein) onto the undesired plants or the harmful plants, on parts of the undesired plants or the harmful plants, or on the area where the undesired plants or the harmful plants grow.

The preferred application rates [indicated as g/ha i.e. grams of active ingredient per hectare] of the herbicides (components (i) and (ii)) used in the context of the present invention as defined herein are as follows.

In a preferred method for controlling undesired plant growth and/or for controlling harmful plants, the total amount per hectare per Gregorian calendar year of component (i) is

- in the range from 300 to 1,000, preferably 400 to 800 g/ha, if (i) is glufosinate (and/or agronomically acceptable salts thereof) and if the crop in which the undesired plants are controlled is a row crop such as soybeans, corn, canola, cotton, cereals or rice;
- in the range from 150 to 500, preferably 200 to 400 g/ha, if (i) is L-glufosinate (and/or agronomically acceptable salts thereof) and if the crop in which the undesired plants are controlled is a row crop such as soybeans, corn, canola, cotton, cereals or rice;
- in the range from 300 to 6,000, preferably 400 to 3,000 g/ha, if (i) is glufosinate (and/or agronomically acceptable salts thereof) and if the crop in which the undesired plants are controlled is specialty crop such as fruits, vegetables or other permanent specialty or plantation crops such as trees, nuts, vines, ornamentals, oil palm, banana, rubber, sugarcane and the like; and
- in the range from 150 to 3,000, preferably 200 to 1,500 g/ha, if (i) is L-glufosinate (and/or agronomically acceptable salts thereof) and if the crop in which the undesired plants are controlled is a specialty crop such as fruits, vegetables or other permanent specialty or plantation crops such as trees, nuts, vines, ornamentals, oil palm, banana, rubber, sugarcane and the like.

In a preferred method for controlling undesired plant growth and/or for controlling harmful plants, the total amount per hectare per Gregorian calendar year of component (ii) is

- in the range from 0.15 to 10, preferably 0.4 to 3 g/ha, if the crop in which the undesired plants are controlled is a row crop such as soybeans, corn, canola, cotton, cereals or rice; and
- in the range from 0.15 to 60, preferably 0.4 to 12 g/ha, if the crop in which the undesired plants are controlled is a specialty crop such as fruits, vegetables or other permanent specialty or plantation crops such as trees, nuts, vines, ornamentals, oil palm, banana, rubber, sugarcane and the like.

In a particularly preferred method for controlling undesired plant growth and/or for controlling harmful plants,

- the total amount per hectare per Gregorian calendar year of component (i) is in the range from 300 to 1,000, preferably 400 to 800 g/ha, and the total amount per hectare per Gregorian calendar year of component (ii) is in the range from 0.15 to 10, preferably 0.4 to 3 g/ha, if (i) is glufosinate (and/or agronomically acceptable salts thereof) and if the crop in which the undesired plants are controlled is a row crop such as soybeans, corn, canola, cotton, cereals or rice;
- the total amount per hectare per Gregorian calendar year of component (i) is in the range from 150 to 500, preferably 200 to 400 g/ha, and the total amount per hectare per Gregorian calendar year of component (ii) is in the range from 0.15 to 10, preferably 0.4 to 3 g/ha, if (i) is L-glufosinate (and/or agronomically acceptable salts thereof) and if the crop in which the undesired plants are controlled is a row crop such as soybeans, corn, canola, cotton, cereals or rice;
- the total amount per hectare per Gregorian calendar year of component (i) is in the range from 300 to 6,000, preferably 400 to 3,000 g/ha, and the total amount per hectare per Gregorian calendar year of component (ii) is in the range from 0.15 to 60, preferably 0.4 to 12 g/ha, if (i) is glufosinate (and/or agronomically acceptable salts thereof) and if the crop in which the undesired plants are controlled is a specialty crop such as fruits, vegetables or other permanent specialty or plantation crops such as trees, nuts, vines, ornamentals, oil palm, banana, rubber, sugarcane and the like; and
- the total amount per hectare per Gregorian calendar year of component (i) is in the range from 150 to 3,000, preferably 200 to 1,500 g/ha, and the total amount per hectare per Gregorian calendar year of component (ii) is in the range from 0.15 to 60, preferably 0.4 to 12 g/ha, if (i) is L-glufosinate (and/or agronomically acceptable salts thereof) and if the crop in which the undesired plants are controlled is a specialty crop such as fruits, vegetables or other permanent specialty or plantation crops such as trees, nuts, vines, ornamentals, oil palm, banana, rubber, sugarcane and the like In another preferred method for controlling undesired plant growth and/or for controlling harmful plants, the total amount per hectare per Gregorian calendar year of component (ii) is in the range from 0.5 to 20, preferably 1 to 10 g/ha, if the crop in which the undesired plants are controlled is a row crop such as soybeans, corn, canola, cotton, cereals or rice; and in the range from 0.5 to 120, preferably 1 to 40 g/ha, if the crop in which the undesired plants are controlled is a specialty crop such as fruits, vegetables or other permanent specialty or plantation crops such as trees, nuts, vines, ornamentals, oil palm, banana, rubber, sugarcane and the like.

In a particularly preferred method for controlling undesired plant growth and/or for controlling harmful plants, the total amount per hectare per Gregorian calendar year of component (i) is in the range from 300 to 1,000, preferably 400 to 800 g/ha, and the total amount per hectare per Gregorian calendar year of component (ii) is in the range from 0.5 to 20, preferably 1 to 10 g/ha, if (i) is glufosinate (and/or agronomically acceptable salts thereof) if the crop in which the undesired plants are controlled is a row crop such as soybeans, corn, canola, cotton, cereals or rice;

the total amount per hectare per Gregorian calendar year of component (i) is in the range from 150 to 500, preferably 200 to 400 g/ha, and the total amount per hectare per Gregorian calendar year of component (ii) is in the range from 0.5 to 20, preferably 1 to 10 g/ha, if (i) is L-glufosinate (and/or agronomically acceptable salts thereof) if the crop in which the undesired plants are controlled is a row crop such as soybeans, corn, canola, cotton, cereals or rice;

the total amount per hectare per Gregorian calendar year of component (i) is in the range from 300 to 6,000, preferably 400 to 3,000 g/ha, and the total amount per hectare per Gregorian calendar year of component (ii) is in the range from 0.5 to 120, preferably 1 to 40 g/ha, if (i) is glufosinate (and/or agronomically acceptable salts thereof) if the crop in which the undesired plants are controlled is a specialty crop such as as fruits, vegetables or other permanent specialty or plantation crops such as trees, nuts, vines, ornamentals, oil palm, banana, rubber, sugarcane and the like; and the total amount per hectare per Gregorian calendar year of component (i) is in the range from 150 to 3,000, preferably 200 to 1,500 g/ha, and the total amount per hectare per Gregorian calendar year of component (ii) is in the range from 0.5 to 120, preferably 1 to 40 g/ha, if (i) is L-glufosinate (and/or agronomically acceptable salts thereof) and if the crop in which the undesired plants are controlled is a specialty crop such as fruits, vegetables or other permanent specialty or plantation crops such as trees, nuts, vines, ornamentals, oil palm, banana, rubber, sugarcane and the like.

These lower amounts of component (ii) epyrifenacil are particularly suitable to achieve the surprising and desired aspects (III), (IV) and/or (V) mentioned above in the context of the present invention.

In a preferred method for controlling undesired plant growth and/or for controlling harmful plants, the total amount per hectare per Gregorian calendar year of component (i) L-glufosinate and the agronomically acceptable salts thereof does not exceed 1000 g, and preferably does not exceed 900 g.

In many cases it is preferred in the context of a method for controlling undesired plant growth, and/or for controlling harmful plants according to the present invention that the total amount per hectare per Gregorian calendar year of component (i) L-glufosinate and the agronomically acceptable salts thereof does not exceed 750 g, more preferably does not exceed 600 g, and even more preferably does not exceed 480 g.

In a preferred method for controlling undesired plant growth and/or for controlling harmful plants, the total amount per hectare per Gregorian calendar year of component (ii) epyrifenacil does not exceed 30 g, and preferably does not exceed 25 g.

These lower amounts of component (ii) epyrifenacil are particularly suitable to achieve the surprising and desired aspects (c), (d) and/or (e) mentioned above in the context of the present invention.

In a particularly preferred method for controlling undesired plant growth and/or for controlling harmful plants, the total amount per hectare per Gregorian calendar year of component (i) L-glufosinate and the agronomically acceptable salts thereof does not exceed 900 g (and preferably does not exceed 600 g), and the total amount per hectare per Gregorian calendar year of component (ii) epyrifenacil does not exceed 25 g.

In a more particularly preferred method for controlling undesired plant growth and/or for controlling harmful plants, the total amount per hectare per Gregorian calendar year of component (i) L-glufosinate and the agronomically acceptable salts thereof does not exceed 750 g (preferably does not exceed 600 g, and more preferably does not exceed 480 g), and the total amount per hectare per Gregorian calendar year of component (ii) epyrifenacil does not exceed 24 g.

In a preferred method for controlling undesired plant growth and/or for controlling harmful plants, the total amount per hectare per Gregorian calendar year of component (i) glufosinate and the agronomically acceptable salts thereof does not exceed 1,000 g, and preferably does not exceed 800 g.

In a preferred method for controlling undesired plant growth and/or for controlling harmful plants, the total amount per hectare per Gregorian calendar year of component (i) L-glufosinate and the agronomically acceptable salts thereof does not exceed 500 g, and preferably does not exceed 400 g.

In a preferred method for controlling undesired plant growth and/or for controlling harmful plants, the total amount per hectare per Gregorian calendar year of component (ii) epyrifenacil does not exceed 20 g, and preferably does not exceed 10 g.

These lower amounts of component (ii) epyrifenacil are particularly suitable to achieve the surprising and desired aspects (c), (d) and/or (e) mentioned above in the context of the present invention.

In a particularly preferred method for controlling undesired plant growth and/or for controlling harmful plants, the total amount per hectare per Gregorian calendar year of component (i) glufosinate and the agronomically acceptable salts thereof does not exceed 1,000 g (and preferably does not exceed 800 g), and the total amount per hectare per Gregorian calendar year of component (ii) epyrifenacil does not exceed 20 g (and preferably does not exceed 10 g).

In a particularly preferred method for controlling undesired plant growth and/or for controlling harmful plants, the total amount per hectare per Gregorian calendar year of component (i) L-glufosinate and the agronomically acceptable salts thereof does not exceed 500 g (and preferably does not exceed 400 g), and the total amount per hectare per Gregorian calendar year of component (ii) epyrifenacil does not exceed 20 g (and preferably does not exceed 10 g).

Preferably, the combinations of herbicides according to the present invention as defined herein or the compositions according to the present invention as defined herein are applied in a method for controlling undesired plant growth and/or for controlling harmful plants on permanent crops and/or on permanent crop land. Preferably, the permanent crops in the context of the present invention are plantation crops, and preferably are selected from the group consisting fruit crops and orchard crops (preferably fruit trees, citrus trees, mango trees, olive trees, grape vines, coffee, cocoa, tea, and berries (such as strawberries, raspberries, blueberries and currants)), Musaceae sp. crops (for example banana or plantain crops), nut trees (preferably almond trees, walnut trees, pistachio trees, pecan trees, hazelnut trees), oil palm trees, rubber trees, sugarcane and cotton. Even more preferably, the permanent crops in the context of the present invention are those mentioned above as even more preferred permanent crops, particularly preferably, the permanent crops in the context of the present invention are those mentioned above as particularly preferred permanent crops. The inventive mixtures can be converted into customary types of agrochemical mixtures, e.g. solutions, emulsions, suspensions, dusts, powders, pastes, granules, pressings, capsules, and mixtures thereof. Examples for mixture types are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further mixtures types are defined in the "Catalogue of pesticide formulation types and international coding system", Technical Monograph No. 2, 6th Ed. May 2008, CropLife International.

The individual formulation types are known in principle and are described for example, in: Winnacker-Küchler, "Chemische Technologie", Volume 7, C. Hauser Verlag Munich, 4$^{th}$ Edition, 1986; van Valkenburg, "Pesticide Formulations", Marcel Dekker N.Y., 1973; K. Martens, "Spray Drying Handbook", 3rd Ed. 1979, G. Goodwin Ltd. London.

The formulation auxiliaries required, such as inert materials, surfactants, solvents and other additives are also known and are described, for example, in Watkins, "Handbook of Insecticide Dust Diluents and Carriers", 2nd Ed., Darland Books, Caldwell N.J.; H.v. Olphen, "Introduction to Clay Colloid Chemistry"; 2nd Ed., J. Wiley & Sons, N.Y. Marsden, "Solvents Guide", 2nd Ed., Interscience, N.Y. 1950; McCutcheon's, "Detergents and Emulsifiers Annual", MC Publ. Corp., Ridgewood N.J.; Sisley and Wood, "Encyclopedia of Surface Active Agents", Chem. Publ. Co. Inc., N.Y. 1964; Schönfeldt, "Grenzflächenaktive Äthylenoxidaddukte" [Surface-active ethylene oxide adducts], Wiss. Verlagsgesellschaft, Stuttgart 1976, Winnacker-Küchler, "Chemische Technologie", Volume 7, C. Hauser Verlag Munich, 4$^{th}$ Edition 1986.

The mixtures are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

Herbicidal formulations comprising glufosinate or salts thereof (such as glufosinate-ammonium), are well known in the art, for example, from EP 0048436, EP 0336151 A2, U.S. Pat. Nos. 5,258,358, 5,491,125, US 2005/0266995 A1, US 2005/0266998 A1, US 2005/266999 A1, US 2007/0184982 A1 or US 2008/0045415 A1, and such formulations are suitable in the context of the present invention.

Examples of general suitable formulation auxiliaries are listed herein below.

Suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e.g. toluene, paraffin, tetrahydronaphthalene, alkylated naphthalenes; alcohols, e.g. ethanol, propanol, butanol, benzylalcohol, cyclo-hexanol; glycols; DMSO; ketones, e.g. cyclo-hexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharides, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol. 1: Emulsifiers & Deter-gents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkyl-naphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of poly-ethylene oxide and polypropylene oxide, or of the A-B-C type comprising alkanol, poly-ethylene oxide and polypropylene oxide.

Suitable polyelectrolytes are polyacids or polybases. Examples of polyacids are alkali salts of poly-acrylic acid or polyacid comb polymers. Examples of polybases are polyvinylamines or polyethyleneimines.

Suitable adjuvants are compounds, which have a neglectable or even no pesticidal activity themselves, and which improve the biological performance of the inventive mixtures on the target. Examples are surfactants, mineral or vegetable oils, and other auxiliaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Examples for mixture types and their preparation are:

i) Water-Soluble Concentrates (SL, LS)

10-60 wt % of an inventive mixture and 5-15 wt % wetting agent (e.g. alcohol alkoxylates) are dissolved in water and/or in a water-soluble solvent (e.g. alcohols) ad 100 wt %. The active substance dissolves upon dilution with water.

ii) Dispersible Concentrates (DC)

5-25 wt % of an inventive mixture and 1-10 wt % dispersant (e.g. polyvinylpyrrolidone) are dissolved in organic solvent (e.g. cyclohexanone) ad 100 wt %. Dilution with water gives a dispersion.

iii) Emulsifiable Concentrates (EC)

15-70 wt % of an inventive mixture and 5-10 wt % emulsifiers (e.g. calcium dodecylbenzenesulfonate and castor oil ethoxylate) are dissolved in water-insoluble organic solvent (e.g. aromatic hydrocarbon) ad 100 wt %. Dilution with water gives an emulsion.

iv) Emulsions (EW, EO, ES)

5-40 wt % of an inventive mixture and 1-10 wt % emulsifiers (e.g. calcium dodecylbenzenesulfonate and castor oil ethoxylate) are dissolved in 20-40 wt % water-insoluble organic solvent (e.g. aromatic hydrocarbon). This mixture is introduced into water ad 100 wt % by means of an emulsifying machine and made into a homogeneous emulsion. Dilution with water gives an emulsion.

v) Suspensions (SC, OD, FS)

In an agitated ball mill, 20-60 wt % of an inventive mixture are comminuted with addition of 2-10 wt % dispersants and wetting agents (e.g. sodium lignosulfonate and alcohol ethoxylate), 0.1-2 wt % thickener (e.g. xanthan gum) and water ad 100 wt % to give a fine active substance suspension. Dilution with water gives a stable suspension of the active substance. For FS type mixture up to 40 wt % binder (e.g. polyvinylalcohol) is added.

vi) Water-Dispersible Granules and Water-Soluble Granules (WG, SG)

50-80 wt % of an inventive mixture are ground finely with addition of dispersants and wetting agents (e.g. sodium lignosulfonate and alcohol ethoxylate) ad 100 wt % and prepared as water-dispersible or water-soluble granules by means of technical appliances (e.g. extrusion, spray tower, fluidized bed). Dilution with water gives a stable dispersion or solution of the active substance.

vii) Water-Dispersible Powders and Water-Soluble Powders (WP, SP, WS)

50-80 wt % of an inventive mixture are ground in a rotor-stator mill with addition of 1-5 wt % dispersants (e.g. sodium lignosulfonate), 1-3 wt % wetting agents (e.g. alcohol ethoxylate) and solid carrier (e.g. silica gel) ad 100 wt %. Dilution with water gives a stable dispersion or solution of the active substance.

viii) Gel (GW, GF)

In an agitated ball mill, 5-25 wt % of an inventive mixture are comminuted with addition of 3-10 wt % dispersants (e.g. sodium lignosulfonate), 1-5 wt % thickener (e.g. carboxymethylcellulose) and water ad 100 wt % to give a fine suspension of the active substance. Dilution with water gives a stable suspension of the active substance.

ix) Microemulsion (ME)

5-20 wt % of an inventive mixture are added to 5-30 wt % organic solvent blend (e.g. fatty acid dimethylamide and cyclohexanone), 10-25 wt % surfactant blend (e.g. alcohol ethoxylate and arylphenol ethoxylate), and water ad 100%. This mixture is stirred for 1 h to produce spontaneously a thermodynamically stable microemulsion.

x) Microcapsules (CS)

An oil phase comprising 5-50 wt % of an inventive mixture, 0-40 wt % water insoluble organic solvent (e.g. aromatic hydrocarbon), 2-15 wt % acrylic monomers (e.g. methylmethacrylate, meth-acrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt % of an inventive mixture according to the invention, 0-40 wt % water insoluble organic solvent (e.g. aromatic hydrocarbon), and an isocyanate monomer (e.g. diphenylmethene-4,4'-diisocyanatae) are dispersed into an aqueous solution of a protective colloid (e.g. polyvinyl alcohol). The addition of a polyamine (e.g. hexamethylenediamine) results in the formation of polyurea microcapsules. The monomers amount to 1-10 wt %. The wt % relate to the total CS mixture.

xi) Dustable powders (DP, DS)

1-10 wt % of an inventive mixture are ground finely and mixed intimately with solid carrier (e.g. finely divided kaolin) ad 100 wt %.

xii) Granules (GR, FG)

0.5-30 wt % of an inventive mixture is ground finely and associated with solid carrier (e.g. silicate) ad 100 wt %. Granulation is achieved by extrusion, spray-drying or fluidized bed.

xiii) Ultra-Low Volume Liquids (UL)

1-50 wt % of an inventive mixture are dissolved in organic solvent (e.g. aromatic hydrocarbon) ad 100 wt %.

The mixtures types i) to xiii) may optionally comprise further auxiliaries, such as 0.1-1 wt % bactericides, 5-15 wt % anti-freezing agents, 0.1-1 wt % anti-foaming agents, and 0.1-1 wt % colorants.

The resulting agrochemical mixtures generally comprise between 0.01 and 95%, preferably between 0.1 and 90%, and in particular between 0.5 and 75%, by weight of active substance.

The active substances are employed in a purity of from 90% to 100%, preferably from 95% to 100% (according to NMR spectrum).

Solutions for seed treatment (LS), Suspoemulsions (SE), flowable concentrates (FS), powders for dry treatment (DS), water-dispersible powders for slurry treatment (WS), water-soluble powders (SS), emulsions (ES), emulsifiable concentrates (EC) and gels (GF) are usually employed for the purposes of treatment of plant propagation materials, particularly seeds. The mixtures in question give, after two-to-tenfold dilution, active substance concentrations of from 0.01 to 60% by weight, preferably from 0.1 to 40%, in the ready-to-use preparations. Application can be carried out before or during sowing. Methods for applying the inventive mixtures and mixtures thereof, respectively, on to plant propagation material, especially seeds include dressing, coating, pelleting, dusting, soaking and in-furrow application methods of the propagation material. Preferably, the inventive mixtures or the mixtures thereof, respectively, are applied on to the plant propagation material by a method such that germination is not induced, e.g. by seed dressing, pelleting, coating and dusting.

The invention also relates to an herbicidal formulation, which comprises a herbicidally active mixture as defined herein and at least one carrier material, including liquid and/or solid carrier materials.

Various types of oils, wetters, adjuvants, fertilizer, or micronutrients, and further pesticides (e.g. herbicides, insecticides, fungicides, growth regulators, safeners) may be added to the active substances or the inventive mixtures comprising them as premix or, if appropriate not until immediately prior to use (tank mix). These agents can be admixed with the inventive mixtures in a weight ratio of 1:100 to 100:1, preferably 1:10 to 10:1.

The user applies the mixture according to the invention usually from a predosage device, a knapsack sprayer, a spray tank, a spray plane, or an irrigation system. Usually, the agrochemical mixture is made up with water, buffer, and/or further auxiliaries to the desired application concentration and the ready-to-use spray liquor or the agrochemical mixture according to the invention is thus obtained. Usually, 20 to 2000 liters, preferably 50 to 400 liters, of the ready-to-use spray liquor are applied per hectare of agricultural useful area.

The inventive mixtures can be applied in conventional manner by using techniques as skilled person is familiar with. Suitable techniques include spraying, atomizing, dusting, spreading or watering. The type of application depends on the intended purpose in a well known manner; in any case, they should ensure the finest possible distribution of the active ingredients according to the invention.

The present invention relates to a method for controlling undesirable vegetation, which method comprises applying an inventive mixture to a locus where undesirable vegetation is present or is expected to be present, wherein application can be done before, during and/or after, preferably during and/or after, the emergence of the undesirable vegetation As used herein, the terms "controlling" and "combating" are synonyms.

As used herein, the terms "undesirable vegetation", "undesirable species", "undesirable plants", "harmful plants", "undesirable weeds", or "harmful weeds" are synonyms.

The term "locus", as used herein, means the area in which the vegetation or plants are growing or will grow, typically a field.

It is a particular benefit of the inventive mixtures that they have a very good post-emergence herbicide activity, i.e. they show a good herbicidal activity against emerged undesirable plants.

Thus, in a preferred embodiment of invention, the inventive mixtures are applied post emergence, i.e. during and/or after, the emergence of the undesirable plants. It is particularly advantageous to apply the inventive mixtures post emergent when the undesirable plant starts with leaf development up to flowering. The inventive mixtures are particularly useful for controlling undesirable vegetation which has already developed to a state, which is difficult to control with conventional burndown mixtures, i.e. when the individual weed is taller than 10 cm (4 inches) or even taller than 15 cm (6 inches) and/or for heavy weed populations.

In the case of a post-emergence treatment of the plants, the inventive mixtures are preferably applied by foliar application.

If the active compounds I and II are less well tolerated by certain crop plants, application techniques may be used in which the herbicidal compositions are sprayed, with the aid of the spraying equipment, in such a way that as far as possible they do not come into contact with the leaves of the sensitive crop plants, while the active compounds reach the leaves of undesirable plants growing underneath, or the bare soil surface (post-directed, lay-by). In addition, spray shields may be used.

When using the inventive mixtures in the methods of the present invention, the active compounds present in the inventive mixtures can be applied simultaneously or in succession, where undesirable vegetation may occur. Herein, it is immaterial whether the individual compounds present in the inventive mixtures are formulated jointly or separately and applied jointly or separately, and, in the case of separate application, in which order the application takes place. It is only necessary, that the individual compounds present in the inventive mixtures are applied in a time frame, which allows simultaneous action of the active ingredients on the undesirable plants.

The invention furthermore relates to the use of a mixture as defined herein for controlling undesirable vegetation in crops in a burndown program, wherein the crop is produced by genetic engineering or by breeding, are resistant to one or more herbicides and/or pathogens such as plant-pathogenous fungi, and/or to attack by insects; preferably resistant to glufosinate.

Thus, in as used in the present invention, the term "crops" as used herein includes also (crop) plants which have been modified by mutagenesis or genetic engineering in order to provide a new trait to a plant or to modify an already present trait.

Mutagenesis includes techniques of random mutagenesis using X-rays or mutagenic chemicals, but also techniques of targeted mutagenesis, in order to create mutations at a specific locus of a plant genome. Targeted mutagenesis techniques frequently use oligonucleotides or proteins like CRISPR/Cas, zinc-finger nucleases, TALENs or meganucleases to achieve the targeting effect.

Genetic engineering usually uses recombinant DNA techniques to create modifications in a plant genome which under natural circumstances cannot readily be obtained by cross breeding, mutagenesis or natural recombination. Typically, one or more genes are integrated into the genome of a plant in order to add a trait or improve a trait. These integrated genes are also referred to as transgenes in the art, while plant comprising such transgenes are referred to as transgenic plants. The process of plant transformation usually produces several transformation events, which differ in the genomic locus in which a transgene has been integrated. Plants comprising a specific transgene on a specific genomic locus are usually described as comprising a specific "event", which is referred to by a specific event name. Traits which have been introduced in plants or have been modified include in particular herbicide tolerance, insect resistance, in-creased yield and tolerance to abiotic conditions, like drought.

Herbicide tolerance has been created by using mutagenesis as well as using genetic engineering. Plants which have been rendered tolerant to acetolactate synthase (ALS) inhibitor herbicides by conventional methods of mutagenesis and breeding comprise plant varieties commercially available under the name Clearfield®. However, most of the herbicide tolerance traits have been created via the use of transgenes.

Herbicide tolerance has been created to glyphosate, glufosinate, 2,4-D, dicamba, oxynil herbicides, like bromoxynil and ioxynil, sulfonylurea herbicides, ALS inhibitor herbicides and 4-hydroxyphenylpyruvate dioxygenase (HPPD) inhibitors, like isoxaflutole and mesotrione.

Transgenes which have been used to provide herbicide tolerance traits comprise: for tolerance to glyphosate: cp4 epsps, epsps grg23ace5, mepsps, 2mepsps, gat4601, gat4621 and goxv247, for tolerance to glufosinate: pat and bar, for tolerance to 2,4-D: aad-1 and aad-12, for tolerance to dicamba: dmo, for tolerance to oxynil herbicies: bxn, for tolerance to sulfonylurea herbicides: zm-hra, csr1-2, gm-hra, S4-HrA, for tolerance to ALS inhibitor herbicides: csr1-2, for tolerance to HPPD inhibitor herbicides: hppdPF, W336 and avhppd-03.

Transgenic corn events comprising herbicide tolerance genes are for example, but not excluding others, DAS40278, MON801, MON802, MON809, MON810, MON832, MON87411, MON87419, MON87427, MON88017, MON89034, NK603, GA21, MZHG0JG, HCEM485, VCO-Ø1981-5, 676, 678, 680, 33121, 4114, 59122, 98140, Bt10, Bt176, CBH-351, DBT418, DLL25, MS3, MS6, MZIR098, T25, TC1507 and TC6275.

Transgenic soybean events comprising herbicide tolerance genes are for example, but not excluding others, GTS 40-3-2, MON87705, MON87708, MON87712, MON87769, MON89788, A2704-12, A2704-21, A5547-127, A5547-35, DP356043, DAS44406-6, DAS68416-4, DAS81419-2, GU262, SYHTØH2, W62, W98, FG72 and CV127.

Transgenic cotton events comprising herbicide tolerance genes are for example, but not excluding others, 19-51a, 31707, 42317, 81910, 281-24-236, 3006-210-23, BXN10211, BXN10215, BXN10222, BXN10224, MON1445, MON1698, MON88701, MON88913, GHB119, GHB614, LLCotton25, T303-3 and T304-40.

Transgenic canola events comprising herbicide tolerance genes are for example, but not excluding others, MON88302, HCR-1, HCN10, HCN28, HCN92, MS1, MS8, PHY14, PHY23, PHY35, PHY36, RF1, RF2 and RF3.

Insect resistance has mainly been created by transferring bacterial genes for insecticidal proteins to plants. Transgenes which have most frequently been used are toxin genes of *Bacillus* spec. and synthetic variants thereof, like cry1A, cry1Ab, cry1Ab-Ac, cry1Ac, cry1A.105, cry1F, cry1Fa2, cry2Ab2, cry2Ae, mcry3A, ecry3.1Ab, cry3Bb1, cry34Ab1, cry35Ab1, cry9C, vip3A(a), vip3Aa20. However, also genes of plant origin have been transferred to other plants. In particular genes coding for protease inhibitors, like CpTI and pinII. A further approach uses transgenes in order to produce double stranded RNA in plants to target and downregulate insect genes. An example for such a transgene is dvsnf7.

Transgenic corn events comprising genes for insecticidal proteins or double stranded RNA are for example, but not excluding others, Bt10, Bt11, Bt176, MON801, MON802, MON809, MON810, MON863, MON87411, MON88017, MON89034, 33121, 4114, 5307, 59122, TC1507, TC6275, CBH-351, MIR162, DBT418 and MZIR098.

Transgenic soybean events comprising genes for insecticidal proteins are for example, but not excluding others, MON87701, MON87751 and DAS-81419.

Transgenic cotton events comprising genes for insecticidal proteins are for example, but not excluding others, SGK321, MON531, MON757, MON1076, MON15985, 31707, 31803, 31807, 31808, 42317, BNLA-601, Event1, COT67B, COT102, T303-3, T304-40, GFM Cry1A, GK12, MLS 9124, 281-24-236, 3006-210-23, GHB119 and SGK321.

Increased yield has been created by increasing ear biomass using the transgene athb17, being present in corn event MON87403, or by enhancing photosynthesis using the transgene bbx32, being present in the soybean event MON87712.

Crops comprising a modified oil content have been created by using the transgenes: gm-fad2-1, Pj.D6D, Nc.Fad3, fad2-1A and fatb1-A. Soybean events comprising at least one of these genes are: 260-05, MON87705 and MON87769.

Tolerance to abiotic conditions, in particular to tolerance to drought, has been created by using the transgene cspB, comprised by the corn event MON87460 and by using the transgene Hahb-4, comprised by soybean event IND-00410-5.

Traits are frequently combined by combining genes in a transformation event or by combining different events during the breeding process. Preferred combination of traits are herbicide tolerance to different groups of herbicides, insect tolerance to different kind of insects, in particular tolerance to lepidopteran and coleopteran insects, herbicide tolerance with one or several types of insect resistance, herbicide tolerance with increased yield as well as a combination of herbicide tolerance and tolerance to abiotic conditions.

Plants comprising singular or stacked traits as well as the genes and events providing these traits are well known in the art. For example, detailed information as to the mutagenized or integrated genes and the respective events are available from websites of the organizations "International Service for the Acquisition of Agri-biotech Applications (ISAAA)"

(http://www.isaaa.org/gmapprovaldatabase) and the "Center for Environmental Risk Assessment (CERA)" (http://cera-gmc.org/GMCropDatabase), as well as in patent applications, like EP3028573 and WO2017/011288.

The use of inventive mixtures on crops may result in effects which are specific to a crop comprising a certain gene or event. These effects might involve changes in growth behavior or changed resistance to biotic or abiotic stress factors. Such effects may in particular comprise enhanced yield, enhanced resistance or tolerance to insects, nematodes, fungal, bacterial, mycoplasma, viral or viroid pathogens as well as early vigour, early or delayed ripening, cold or heat tolerance as well as changed amino acid or fatty acid spectrum or content.

Furthermore, plants are also covered that contain by the use of recombinant DNA techniques a modified amount of ingredients or new ingredients, specifically to improve raw material production, e.g., potatoes that produce increased amounts of amylopectin (e.g. Amflora® potato, BASF SE, Germany).

As already described in more detail above, the present invention further relates to the use of combination of herbicides according to the present invention (preferably in one of the preferred embodiments defined herein) or a composition according to the present invention (preferably in one of the preferred embodiments defined herein) in the field of agriculture, in particular as plant growth regulators and/or for controlling harmful plants or undesired plant growth.

EXAMPLES

The effect of herbicidal combination of the present invention, component (i), component (ii) on the growth of undesirable plants compared to the herbicidally active compounds alone was demonstrated in a series of greenhouse experiments:

- For post-emergence treatments, glufosinate and epyrifenacil, which had been suspended in water, were applied using spray nozzles providing fine to coarse droplets.
- The herbicide compounds applied in the examples were used as experimental or commercially available solo or premix formulations which have been diluted with tap water to a suitable concentration. Glufosinate was used as a commercial SL formulation containing 150 g ai/l of glufosinate (BAS 1000 12H, 150 SL, BASF). While the PPO herbicide EXP 5296489 H-AC containing 50 g ai/l epyrifenacil was used.
- The evaluation for plant injury or damage caused by the chemical compositions was carried out using a scale from 0-100% when compared with the untreated control plants. Here, 0 means no damage and 100 means complete destruction of the plants.

Colby's formula was applied to determine whether the composition showed synergistic action: S. R. Colby (1967) "Calculating synergistic and antagonistic responses of herbicide combinations", Weeds 15, p. 22., $E=X+Y-(X*Y/100)$, where

- X=effect in percent using herbicide A at an application rate of a;
- Y=effect in percent using herbicide B at an application rate of b;
- E=expected effect (in %) of A+B at application rates a+b.

The value E corresponds to the effect (plant damage or injury) which is to be expected if the activity of the individual compounds is just additive. If the observed effect is higher than the value E calculated according to Colby, a synergistic effect is present.

Weed Control of Glufosinate Plus epyrifenacil Mixtures (Greenhouse)

Seedlings of waterhemp (*Amaranthus tuberculatus*; AMATU), Palmer Amaranth (*Amaranthus Palmeri*; AMAPA), wild oats (*Avena fatua*; AVEFA), barley (*Hordeum vulgare*; HORVS), Velvetleaf (Abution *theophrasti*; ABUTH). were treated with postemergence applications of either glufosinate at 50, 100 and 200 g ai/ha, epyrifenacil at 0.9, 0.3, and 0.1 g ai/ha, or the combination of glufosinate (50, 100, 200 g ai/ha) and tiafencil (0.9; 0.3; 0.1 g ai/ha), respectively, when they were 7-18 cm in height. All treatments contained 1% (v/v) MSO surfactant. Plants were placed in a non-randomized design with 1 replication per treatment. Percent injury data was collected 20 days after treatment (DAT).

Ratio 55.6:1

TABLE 1

Demonstration of glufosinate potentiation through the addition of epyrifenacil for the control of *Avena fatua* (AVEFA).

| | Application | | | | |
|---|---|---|---|---|---|
| | Solo | | Combined (0.9 + 50 g ai/ha) | | |
| DAT | epyrifenacil (0.9 g ai/ha) % activity | Glufosinate (50 g ai/ha) % activity | Observed % activity | Expected according to Colby % activity | Synergism Y/N |
| 20 | 15 | 10 | 65 | 24 | Y |

Ratio 55.6:1

TABLE 2

Demonstration of glufosinate potentiation through the addition of epyrifenacil for the control of *Amaranthus tuberculatus* (AMATU).

| | Application | | | | |
|---|---|---|---|---|---|
| | Solo | | Combined (0.9 + 50 g ai/ha) | | |
| DAT | epyrifenacil (0.9 g ai/ha) % activity | Glufosinate (50 g ai/ha) % activity | Observed % activity | Expected according to Colby % activity | Synergism Y/N |
| 20 | 75 | 10 | 98 | 78 | Y |

Ratio 111:1

TABLE 3

Demonstration of glufosinate potentiation through the addition of epyrifenacil for the control of *Amaranthus tuberculatus* (AMATU).

| | Application | | | | |
|---|---|---|---|---|---|
| | Solo | | Combined (0.9 + 100 g ai/ha) | | |
| DAT | epyrifenacil (0.9 g ai/ha) % activity | Glufosinate (100 g ai/ha) % activity | Observed % activity | Expected according to Colby % activity | Synergism Y/N |
| 20 | 75 | 10 | 90 | 78 | Y |

Ratio 222:1

TABLE 4

Demonstration of glufosinate potentiation through the addition of epyrifenacil for the control of *Hordeum vulgare* (HORVS).

| | Application | | | | |
|---|---|---|---|---|---|
| | Solo | | Combined (0.9 + 200 g ai/ha) | | |
| DAT | epyrifenacil (0.9 g ai/ha) % activity | Glufosinate (200 g ai/ha) % activity | Observed % activity | Expected according to Colby % activity | Synergism Y/N |
| 20 | 10 | 25 | 50 | 33 | Y |

Ratio 222:1

TABLE 5

Demonstration of glufosinate potentiation through the addition of epyrifenacil for the control of *Amaranthus Palmeri* (AMAPA)

| | Application | | | | |
|---|---|---|---|---|---|
| | Solo | | Combined (0.9 + 200 g ai/ha) | | |
| DAT | epyrifenacil (0.9 g ai/ha) % activity | Glufosinate (200 g ai/ha) % activity | Observed % activity | Expected according to Colby % activity | Synergism Y/N |
| 20 | 20 | 75 | 98 | 80 | Y |

Ratio 222:1

TABLE 6

Demonstration of glufosinate potentiation through the addition of epyrifenacil for the control of *Amaranthus tuberculatus* (AMATU).

| | Application | | | | |
|---|---|---|---|---|---|
| | Solo | | Combined (0.9 + 200 g ai/ha) | | |
| DAT | epyrifenacil (0.9 g ai/ha) % activity | Glufosinate (200 g ai/ha) % activity | Observed % activity | Expected according to Colby % activity | Synergism Y/N |
| 20 | 75 | 70 | 98 | 93 | Y |

667:1

TABLE 7

Demonstration of glufosinate potentiation through the addition of epyrifenacil for the control of *Amaranthus Palmeri* (AMAPA)

| | Application | | | | |
|---|---|---|---|---|---|
| | Solo | | Combined (0.9 + 200 g ai/ha) | | |
| DAT | epyrifenacil (0.3 g ai/ha) % activity | Glufosinate (200 g ai/ha) % activity | Observed % activity | Expected according to Colby % activity | Synergism Y/N |
| 20 | 15 | 75 | 98 | 79 | Y |

2000:1

TABLE 8

Demonstration of glufosinate potentiation through the addition of epyrifenacil for the control of *Abutilon theophrasti* (ABUTH)

| | Application | | | | |
|---|---|---|---|---|---|
| | Solo | | Combined (0.1 + 200 g ai/ha) | | |
| DAT | epyrifenacil (0.1 g ai/ha) % activity | Glufosinate (200 g ai/ha) % activity | Observed % activity | Expected according to Colby % activity | Synergism Y/N |
| 20 | 25 | 10 | 65 | 33 | Y |

As seen from the data in table 1 to table 8, the combination of glufosinate and tiafenacil provided enhanced control of AMAPA, AMATU, ABUTH, HORVS and AVEFA compared to the individual components. For each weed species, the observed control for the combination of glufosinate and tiafenacil was greater than the estimates of expected control based on the Colby equation, thus demonstrating the potentiating effect of the herbicide mixture.

The invention claimed is:

1. A composition comprising (i) glufosinate, L-glufosinate or an agronomically acceptable salt thereof, and (ii) epyrifenacil, wherein a ratio by weight of a total amount of component (i)

is at least 40 times more than a total amount of component (ii) in case of (i) being glufosinate, and is at least 20 times more than the total amount of component (ii) in case of (i) being L-glufosinate, wherein a total amount of component (i) is from 100 to 600 g/L, based on the total amount of the composition; and wherein the total amount of component (ii) is in the range of from 0.15 to 15 g/L, in case of (i) being glufosinate, and in the range of from 0.2 to 30 g/L, in case of (i) being L-glufosinate, in each case based on the total amount of the composition.

2. The composition according to claim 1, wherein the ratio by weight of the total amount of component (i) to the total amount of component (ii) is from 1000:1 to 50:1 in case of (i) being glufosinate.

3. The composition according to claim 2, wherein the ratio by weight of the total amount of component (i) to the total amount of component (ii) is from 500:1 to 60:1 in case of (i) being glufosinate.

4. The composition according to claim 1, wherein the ratio by weight of the total amount of component (i) to the total amount of component (ii) is from 500:1 to 25:1 in case of (i) being L-glufosinate.

5. The composition according to claim 4, wherein the ratio by weight of the total amount of component (i) to the total amount of component (ii) is from 250:1 to 30:1 in case of (i) being L-glufosinate.

6. The composition according to claim 1, wherein
the total amount of component (i) is in the range of from 150 to 500 g/L,
and
the total amount of component (ii) is in the range of from 0.2 to 10 g/L, in case of (i) being glufosinate, or
the total amount of component (ii) is in the range of from 0.4 to 20 g/L, in case of (i) being L-glufosinate, and
in each case based on the total amount of the mixture.

7. The composition according to claim 1 comprising one or more further components selected from the group consisting of formulation auxiliaries, additives customary in crop protection, and further agrochemically active compounds.

8. The composition according to claim 1, wherein the composition is in the form of a suspension concentrate (SC), oil dispersion (OD), or in form of microcapsules.

9. A method for producing a composition as defined in claim 1, comprising
(a) providing component (i),
(b) providing component (ii), and
(c) combining component (i) and component (ii),
such that the composition is obtained.

10. A method for
controlling undesired plant growth,
and/or
controlling harmful plants,
comprising applying a composition as defined in claim 1 onto the undesired plants or the harmful plants, on parts of the undesired plants or the harmful plants, or on the area where the undesired plants or the harmful plants grow.

11. The method for treating or protecting row crops from undesired plants or the harmful plants according to claim 10, wherein
the total amount of component (i) is applied in the range of from 300 to 1000 g/ha, in case of (i) being glufosinate, or
the total amount of component (i) is applied in the range of from 150 to 500 g/ha, in case of (i) being L-glufosinate, and
the total amount of component (ii) is applied in the range of from 0.5 to 20 g/ha.

12. The method for treating or protecting permanent crops from undesired plants or the harmful plants according to claim 10, wherein
the total amount of component (i) is applied in the range of from 300 to 6000 g/ha, in case of (i) being glufosinate, or
the total amount of component (i) is applied in the range of from 150 to 3000 g/ha, in case of (i) being L-glufosinate, and
the total amount of component (ii) is applied in the range of from 0.5 to 120 g/ha, and wherein the permanent crop is selected from the group consisting of apple trees, pear trees, apricot trees, plum trees, cherry trees, peach trees, olive trees, grape vines, coffee, tea, banana crops, almond trees, walnut trees, oil palm trees, rubber trees, lemon crops, orange crops, and grapefruit crops.

13. The method according to claim 11 wherein the row crop is selected from the group consisting of soybeans, corn, canola, cotton, cereals, rice, sunflower, potato, dry bean, field pea, flax, safflower, buckwheat, and sugar beets.

* * * * *